United States Patent
Von Keitz

(10) Patent No.: US 9,677,697 B2
(45) Date of Patent: Jun. 13, 2017

(54) BREAKAWAY COUPLING

(71) Applicant: Andreas Von Keitz, Diez (DE)

(72) Inventor: Andreas Von Keitz, Diez (DE)

(*) Notice: Subject to any disclaimer, the term of this patent is extended or adjusted under 35 U.S.C. 154(b) by 0 days.

(21) Appl. No.: 14/761,783

(22) PCT Filed: Jan. 3, 2014

(86) PCT No.: PCT/EP2014/050051
§ 371 (c)(1),
(2) Date: Jul. 17, 2015

(87) PCT Pub. No.: WO2014/111279
PCT Pub. Date: Jul. 24, 2014

(65) Prior Publication Data
US 2016/0084416 A1    Mar. 24, 2016

(30) Foreign Application Priority Data
Jan. 17, 2013   (DE) .................... 10 2013 100 485

(51) Int. Cl.
| | | |
|---|---|---|
| *F16L 23/18* | (2006.01) | |
| *F16L 23/00* | (2006.01) | |
| *F16L 29/04* | (2006.01) | |
| *F16L 55/10* | (2006.01) | |

(52) U.S. Cl.
CPC ............ *F16L 23/18* (2013.01); *F16L 23/003* (2013.01); *F16L 29/04* (2013.01); *F16L 55/1015* (2013.01)

(58) Field of Classification Search
CPC ..... F16L 23/18; F16L 23/003; F16L 55/1015; F16L 55/10; F16L 29/04
See application file for complete search history.

(56) References Cited

U.S. PATENT DOCUMENTS

| | | | |
|---|---|---|---|
| 1,369,304 A | | 2/1921 | Schram |
| 2,659,954 A | * | 11/1953 | Woolsey ............... F16L 23/10 24/279 |
| 3,495,853 A | | 2/1970 | Furrer |
| 5,564,715 A | | 10/1996 | Wallace |

(Continued)

FOREIGN PATENT DOCUMENTS

| | | |
|---|---|---|
| DE | 9114005 U1 | 1/1992 |
| DE | 19814559 A1 | 6/1999 |

(Continued)

OTHER PUBLICATIONS

English translation of Written Opinion of the International Searching Authority dated Apr. 4, 2014 for corresponding PCT/EP2014/050051, 7 pages.

(Continued)

*Primary Examiner* — Craig Schneider
*Assistant Examiner* — Kevin Barss
(74) *Attorney, Agent, or Firm* — Ohlandt, Greeley, Ruggiero & Perle, L.L.P.

(57) ABSTRACT

A breakaway coupling with system-tight end flanges on the first and second coupling halves is provided. The end flanges have oblique or conical surfaces and are embraced there by ring segments, which in turn are pressed against the oblique or conical surfaces by a pre-stressing element. With an excessive pull or tension on the coupling halves, the latter can separate counter to the force of the pre-stressing element.

8 Claims, 2 Drawing Sheets

(56) References Cited

U.S. PATENT DOCUMENTS

| | | | | |
|---|---|---|---|---|
| 5,660,417 | A * | 8/1997 | Reeves | G01L 5/24 116/201 |
| 7,086,131 | B2 * | 8/2006 | Gibb | F16L 17/04 29/282 |
| 2004/0075273 | A1 | 4/2004 | Sjoberg | |
| 2008/0012333 | A1 * | 1/2008 | Gauss | F16L 21/00 285/399 |
| 2010/0041287 | A1 | 2/2010 | Woods et al. | |

FOREIGN PATENT DOCUMENTS

| | | | |
|---|---|---|---|
| DE | 20007117 | U1 | 6/2000 |
| DE | 20113541 | U1 | 12/2001 |
| EP | 0517127 | A1 | 12/1992 |
| GB | 952755 | A | 3/1964 |
| WO | 9510720 | A1 | 4/1995 |
| WO | 0242015 | A1 | 5/2002 |

OTHER PUBLICATIONS

English translation of International Preliminary Report on Patentability dated Jul. 30, 2015 from corresponding International Application No. PCT/EP2014/050051, 9 pages.
English translation of International Search Report dated Apr. 4, 2014 for corresponding PCT/EP2014/050051, 2 pages.
German Office Action dated Jul. 19, 2013 for corresponding German Patent Application No. 10 2013 100 483.0, with English translation, 9 pages.
English translation of International Search Report dated Apr. 4, 2014 for corresponding PCT/EP2014/050050, 2 pages.
Japanese Office Action dated Oct. 19, 2016 for corresponding Japanese Patent Application No. 2015-553041, with English machine translation, 8 pages.

* cited by examiner

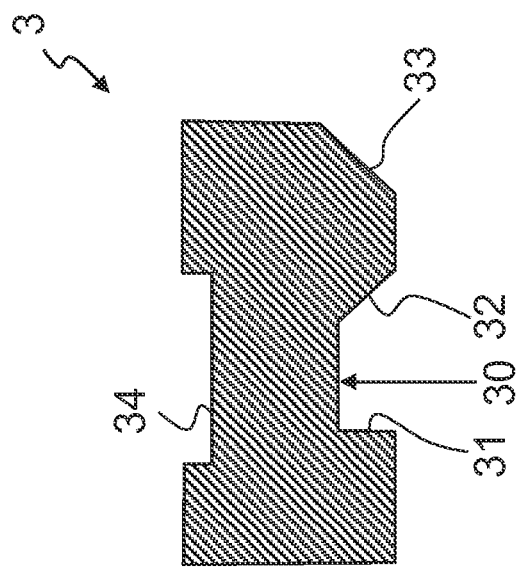
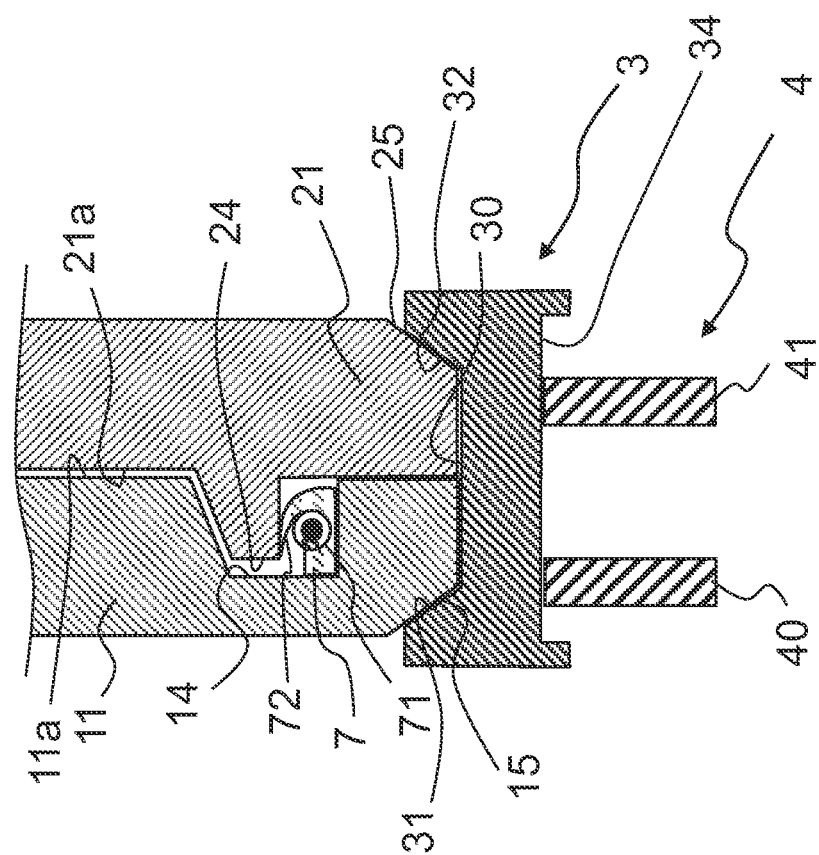

BREAKAWAY COUPLING

CROSS-REFERENCE TO A RELATED APPLICATION

The present application is a continuation application of PCT Application No. PCT/EP2014/050051, which claims priority based on German Application No. DE102013100485.7, both of which are incorporated herein by reference in their entireties.

BACKGROUND OF THE DISCLOSURE

1. Field of the Disclosure

The invention relates to a breakaway coupling for separating two lines in the case of an excessive pull or tension between a first side and a second side of a coupling.

2. Description of the Related Art

When filling or withdrawing fluids from tanks, usually two lines are coupled together, for which purpose an actuatable coupling is used. Whereas one of the lines can be viewed as fixed in place, the other line is movable and connected to a vehicle. Motor vehicles, tanker trucks, cars of all types, ships and even aircraft are considered as vehicles. If such vehicles are set in motion while the connection of the two lines via the actuatable coupling still exists, it may happen that the line connection is torn apart. In order to avoid this, a breakaway coupling is disposed in the connection line run, this breakaway coupling responding when there is excessive pull or tension, and the two lines that are coupled are separated from one another. The breakaway coupling has automatically closing fluid barriers that respond in the case of separation of the lines and block the respective line. In this way, unwanted movements of the vehicle are prevented from leading to an environmentally damaging emergency situation.

Deep-cooled media, for example, liquefied natural gas, are considered as fluids being transported and must be delivered via lines that are coupled together. For these coupled lines, in each case a breakaway coupling is required that withstands the conditions of deep-cooled media.

An emergency disconnect safety coupling is shown in DE 91 14 005 U1. There are two coupling halves that are held together via retaining ring segments, which engage from outside into annular grooves of the connection edges of the coupling halves and which in turn are comprised of a retaining element. A seal that presses the coupling halves together can be disposed between these halves, and thus the coupling parts can be easily disconnected when the radial load is removed. Such a press seal is not very effective in the case of very low temperature.

A tubular connection with collars that lie opposite one another on the end face is known from DE 198 14 559 A1, in which the collars together with an intermediate-lying seal are clamped against one another by means of a detachable clamping device, with the formation of a fluid-tight connection. An O-ring or a flat gasket are named as seals. Such seals are not very effective at very low temperatures.

SUMMARY OF THE DESCRIPTION

The object of the invention is to create a robust and simply constructed breakaway coupling, which is of a type that is also suitable for very low temperature applications. In addition, the force by which the breakaway coupling will be disengaged can be pre-determined by appropriate dimensioning of the breakaway coupling.

The novel breakaway coupling has two coupling halves, each with automatically closing fluid barriers on the inside and system-tight end flanges on opposing sides of the coupling.

The system-tight end flanges are pressed together by a series of ring segments in order to produce a fluid-tight connection between the end flanges. In this case, the end flanges that are engaged with one another are embraced or clasped by the ring segments, but in such a way that the clasp can be disengaged with excessive tension. For this purpose, the ring segments have oblique surfaces or conical surfaces, which are directed so that in the case of a pull on the breakaway coupling, radial forces develop on the ring segments countering the forces of a pre-stressing element. If the radial forces of the ring segments directed outward exceed the radially inward directed forces of the pre-stressing element, the breakaway coupling is disengaged. By dimensioning the pre-stressing element with respect to the radially inward directed forces, one thus has in hand the means for adjusting the tensile or pulling force on the lines at which an emergency separation takes place.

In order to be adapted for very low temperatures, the breakaway coupling has an expansion seal, which contains a metal expansion spring, which presses a sealing lip of the expansion seal to a countersurface of the seal, even in the case of very low temperatures. Polytetrafluoroethylene or a similar material that does not become brittle at very low temperatures can be used as the material of the sealing lip.

BRIEF DESCRIPTION OF THE DRAWINGS

An exemplary embodiment of the invention is described on the basis of the drawing. Here:

FIG. 2 shows an enlarged detail with a ring segment; and

FIG. 3 shows an alternative ring segment.

DETAILED DESCRIPTION OF THE PREFERRED EMBODIMENT

Figure 1:
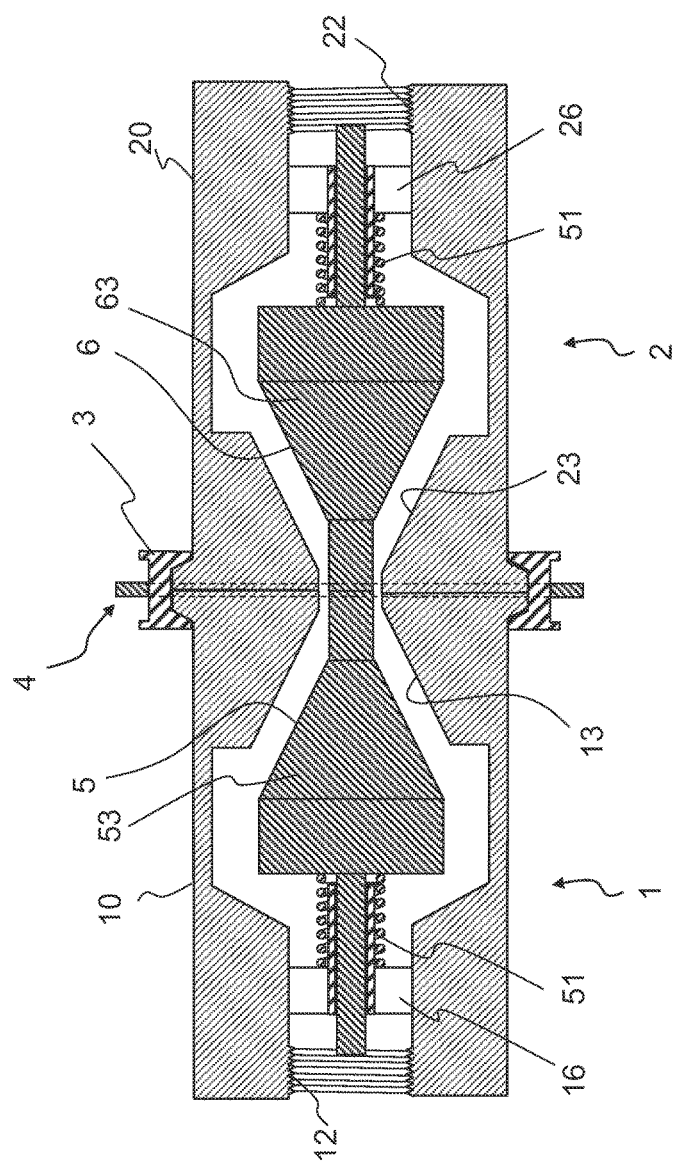
FIG. 1 shows a longitudinal section through a breakaway coupling.

The breakaway coupling comprises a first coupling half 1 and a second coupling half 2, which are kept in the coupled state by a series of ring segments 3. The ring segments 3 themselves are held together and pressed radially inward by a pre-stressing element 4 at the periphery of the breakaway coupling.

The first coupling half 1 has a tube-shaped housing 10, which has a coupling side 11a of a first system-tight end flange or collar 11 introduced there. A connection thread 12 for a secondary line is provided at the other end of the first coupling half. The second coupling half 2 is largely formed mirror-symmetrically to the first coupling half and has a housing 20 with a second system-tight end flange or collar 21 and a second connection thread 22. Each coupling half has an automatically closing fluid barrier 5 or 6, each of which comprises a spring 51 or 61 and a spherical sealing element 53 or 63, which work together with a conical sealing seat 13 or 23 if an emergency disconnection is triggered. The springs 51 or 61 are supported on crosspieces 16 or 26 of the tube-shaped housing 10 or 20.

The end flanges or collars 11 and 21 abut one another at their coupling sides 11a or 21a (FIG. 2), which also interlock. For this purpose, the first end flange or collar 11 has a recess 14 and the second end flange or collar 21 has an annular axial projection 24. An expansion seal 7 that has an expansion spring 71 and a sealing lip 72 made of plastic sits in recess 14 and works together with the axial projection 24 as the seal countersurface. The expansion spring 71, in the shape of a closed coil spring, is composed of metal in order to be effective even at very low temperatures, whereas polytetrafluoroethylene or a material with similar behavior at very low temperatures is preferred for the sealing lip 72.

On the side facing away from the coupling sides 11a or 21a, the end flanges or collars 11 or 21 each have a conical surface as oblique surface 15 or 25, the slopes of which are directed opposite one another, when they are viewed in the radial direction from inside to outside. The conical tips of the two generated cones lie on the axis of the device and the aperture angle of the cone lies in the range of 65° to 25°, a more constricted range of 55° to 35° being preferred.

The ring segments 3 that number three or more ring segments are distributed uniformly around the periphery of the device and have a recess 30 on their radial inner side, which corresponds to the shape of the radial ends of the end flanges having the conical partial surfaces 15 and 25 that are coupled together. Accordingly, the slopes of the edges 31, 32 of the recess 30 correspond to the conical partial surfaces 15 and 25. The ring segments 3 have another, outer recess 34, in which the pre-stressing element 4 engages, and the ring segments are pressed radially inward against the conical surfaces 15 or 25.

The pre-stressing element 4 can have different configurations. A slotted lock washer 40 or several slotted lock washers 40, 41 can be used as the pre-stressing element, these lock washers being composed of a ring clasp with openings next to the ends, in order to be able to spread apart the slotted lock washer for assembly. The pre-stressing element, however, can also be formed by tension coil springs, which extend between the ring segments and hold them together. It is also possible to produce the pre-stressing element by one or more closed coiled springs which wrap around the ring segments. Any design of the pre-stressing element is useful as long as the ring segments 3 are pressed elastically against the system sealing flanges or collars 11, 21 and develop sufficiently strong forces that are directed radially inward.

For the functioning of the breakaway coupling, it is not necessary to provide both edges 31, 32 as oblique surfaces in order to work together with two conical surfaces 15, 25. Only one of these conical surfaces is required, while a cylindrical edge can be formed instead for the other conical surface. It is understood that the recess 30 in the ring segments 3 is formed correspondingly, as shown in FIG. 3. Another outer oblique surface 33, which is useful as a mounting aid, is formed therein. Such a surface can also be present in the case of the embodiment according to FIG. 2.

The mode of operation of the breakaway coupling is as follows:

When the breakaway coupling is delivered, the ring segments 3 embrace the end flanges or collars 11, 21, which are coupled together, as a consequence of the forces directed radially inward, which are introduced by the pre-stressing element 4. Due to the radially symmetric configuration of the breakaway coupling, the latter can be inserted into a gap in a line run by screwing it together with the ends of the line. It is presumed that an actuatable coupling with which the line connection between a delivery vehicle and a tank (or vice versa) is completed is inserted in the line run. Now, if an excessive pull is exercised on the line by an undesired event, the conical surfaces 15 or 25 exert a pressure on at least the oblique countersurface 32 of the recess 30, whereby, due to the removal of force, radial forces directed outward are exercised on the series of ring segments 3. If these forces exceed the retaining forces of the pre-stressing element 4 that are directed inwardly, the pre-stressing element 4 expands and the end flanges or collars 11 or 21 can be pulled out of the recess 30. If this occurs, the coupling halves 1, 2 disengage from one another. The fluid barriers 5 or 6 are then activated, i.e., the springs of these fluid barriers move the sealing cone against the assigned sealing seats 13 or 23. Undesired leakage of fluid is prevented thereby.

The breakaway coupling is re-assembled by spreading apart the pre-stressing element 4, bringing the coupling halves 1, 2 together, and releasing the pre-stressing element 4, whereby the ring segments 3 embrace the radial edge of the engaging end flanges or collars 11, 21, and the breakaway coupling again achieves its functional state.

A robust and simply constructed breakaway coupling has thus been described and disclosed, which is provided with system-tight end flanges 11, 21 on the first and second coupling halves 1, 2. The end flanges 11, 21 have oblique or conical surfaces 15, 25, and are embraced there by ring segments 3, which in turn are pressed against the oblique or conical surfaces 15, 25 by a pre-stressing element 4. With an excessive pull on the coupling halves 1, 2, the latter can separate counter to the force of the pre-stressing element 4.

What is claimed is:

1. A breakaway coupling for separating two lines in the case of an excessive pull or tension between a first side and a second side of a coupling, comprising:
    a first coupling half forming a first system-tight coupling side and having a tube-shaped housing with a cylindrical periphery portion, and an automatically closing fluid barrier on the inside of the housing;
    a second coupling half forming a second system-tight coupling side and having a tube-shaped housing with a cylindrical periphery portion, and an automatically closing fluid barrier on the inside of the housing;
    each of the first and second couplings have an end flange or collar that projects over the respective cylindrical periphery portion of each tube-shaped housing on the first system-tight coupling side and the second system-tight coupling side, respectively, the end flanges or collars being that are separated by a separation surface and are engaged with one another; at least one of said end flange or collar being provided with an oblique or conical surface;
    a series of ring segments having a cross section for embracing the coupling sides engaged with one another at said end flanges or collars, with each ring segment having at least one oblique or conical surface corresponding to said respective oblique or conical surface of said end flanges or collars,
    an expansion seal that sits in a recess of a first end flange or collar, and works together with an axial annular projecting surface of a second end flange or collar as a seal countersurface; and
    a pre-stressing element embracing the ring segments and presses them elastically against the first and second end flanges when the coupling halves are coupled.

2. The breakaway coupling according to claim 1, wherein the pre-stressing element contains a slotted lock washer.

3. The breakaway coupling according to claim 1, wherein the pre-stressing element is formed by tension springs that extend between the ring segments and hold them together.

4. The breakaway coupling according to claim 1, wherein the pre-stressing element is formed by one or more closed coil springs that embrace the ring segments.

5. The breakaway coupling according to claim 1, wherein the conical surfaces have an aperture angle that is in the range of 65° to 25°.

6. The breakaway coupling according to claim 5, wherein the aperture angle is in the range of between 55° to 35°.

7. The breakaway coupling according to claim 1, wherein the ring segments have an outer oblique surface which is opposed in direction to an adjacent oblique or conical surface of the ring segments and is useful as a mounting aid.

8. The breakaway coupling according to claim 1, wherein ends of the first and second coupling halves distanced from the coupling sides are provided with connection threads for secondary lines.

\* \* \* \* \*